United States Patent
Bonney et al.

(10) Patent No.: US 11,057,397 B2
(45) Date of Patent: *Jul. 6, 2021

(54) COMPUTERIZED SYSTEM FOR COMPLYING WITH CERTAIN CRITICAL INFRASTRUCTURE PROTECTION REQUIREMENTS

(71) Applicant: Hoosier Energy Rural Electric Cooperative, Inc., Bloomington, IN (US)

(72) Inventors: Paul Tyler Bonney, Martinsville, IN (US); Richard Ray Field, Bloomington, IN (US)

(73) Assignee: HOOSIER ENERGY RURAL ELECTRIC COOPERATIVE, INC., Bloomington, IN (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/531,843

(22) Filed: Aug. 5, 2019

(65) Prior Publication Data

US 2019/0379676 A1  Dec. 12, 2019

Related U.S. Application Data

(63) Continuation of application No. 16/110,241, filed on Aug. 23, 2018, now Pat. No. 10,389,737, which is a continuation of application No. 14/492,345, filed on Sep. 22, 2014, now Pat. No. 10,069,847.

(60) Provisional application No. 61/885,570, filed on Oct. 2, 2013.

(51) Int. Cl.
G06F 21/57  (2013.01)
H04L 29/06  (2006.01)
G06F 11/30  (2006.01)
G06Q 10/06  (2012.01)

(52) U.S. Cl.
CPC ...... *H04L 63/1408* (2013.01); *G06F 11/3051* (2013.01); *G06F 21/577* (2013.01); *G06Q 10/06* (2013.01); *H04L 63/1433* (2013.01); *G06F 2221/2101* (2013.01)

(58) Field of Classification Search
CPC ............... G06F 11/3051; G06F 21/577; G06F 2221/2101; G06Q 10/06; H04L 63/1408; H04L 63/1433
See application file for complete search history.

(56) References Cited

U.S. PATENT DOCUMENTS

| | | |
|---|---|---|
| 2004/0250116 A1 | 12/2004 | Strickland |
| 2006/0143194 A1 | 6/2006 | Stewart |
| 2006/0143294 A1 | 6/2006 | Bush |
| 2007/0061125 A1 | 3/2007 | Bhatt |

(Continued)

OTHER PUBLICATIONS

U.S. Appl. No. 14/492,345, filed Sep. 22, 2014.

(Continued)

*Primary Examiner* — Theodore C Parsons
(74) *Attorney, Agent, or Firm* — Barnes & Thornburg LLP

(57) ABSTRACT

A computerized system for complying with critical infrastructure protection ("CIP") standards concerning system configuration changes. The system can be used to automatically identify and track changes to computers on the network, improving system security and CIP compliance reporting. In certain embodiments, the system collects system information on servers and workstations using built-in commands. The configuration profiles of these computers/devices can be archived for audit purposes.

20 Claims, 5 Drawing Sheets

(56) References Cited

U.S. PATENT DOCUMENTS

| | | |
|---|---|---|
| 2008/0040790 A1 | 2/2008 | Kuo |
| 2008/0271018 A1 | 10/2008 | Gross |
| 2010/0115601 A1 | 5/2010 | Brandstetter |
| 2012/0216243 A1 | 8/2012 | Gill |

OTHER PUBLICATIONS

U.S. Appl. No. 16/110,241, filed Aug. 23, 2018.
Chee-Wooi Ten; Manimaran, G.; Chen-Ching Liu, Cybersecurity for Critical Infrastructures: Attack and Defense Modeling,: in Systems, Man and Cybernetics, Part A: Systems and Humans, IEEE Transactions on vol. 40, No. 4, pp. 853-865 (IEEE Jul. 2010).
Kelbley; TechNet Magazine; "System Management: Gathering WMI Data without Writing a Single Line of Code"; Sep. 2006; https://technet.microsoft.com/en-us/magazine/2006.09.wmidata.aspx.
PCT International Search Report; dated Jun. 22, 2015; US2014/056965.
North American Electric Reliability Council (NERC), "Critical Infrastructure Protection Standard CIP-007-4; Cyber Security-Systems Security Management," http://www.nerc.com/,rev. 4 (2011).
International Preliminary Report on Patentability; dated Apr. 5, 2016; US2014/056965.

General System Info

| Node | Name | ServicePackLvl | Domain/Workgroup | Manufacturer | Model | PartOfDomain | SystemType |
|---|---|---|---|---|---|---|---|
| B-MB2-BONNEY-VM | Microsoft Windows 7 Enterprise | Service Pack 1 | hoosier.lan | VMware Inc. | VMware Virtual Platform | TRUE | Virtual |

Fig. 4A

Ports and Services

| Node | Protocol | IP Address | Port | PID | Service | SubServices |
|---|---|---|---|---|---|---|
| B-MB2-BONNEY-VM | TCP | 0.0.0.0 | 135 | 628 | svchost.exe | RpcEptMapper;RpcSs |
| B-MB2-BONNEY-VM | TCP | 0.0.0.0 | 445 | 4 | System | |
| B-MB2-BONNEY-VM | TCP | 0.0.0.0 | 49152 | 352 | wininit.exe | |
| B-MB2-BONNEY-VM | TCP | 0.0.0.0 | 49153 | 820 | svchost.exe | AudioSrv;Dhcp;eventlog;lmhosts;wscsvc |
| B-MB2-BONNEY-VM | TCP | 0.0.0.0 | 49154 | 912 | svchost.exe | AeLookupSvc;BITS;EapHost;IKEEXT;iphlpsvc;LanmanServer;MMCSS;ProfSvc;Schedule;SENS;ShellHWDetection;Themes;Winmgmt;wuauserv |
| B-MB2-BONNEY-VM | TCP | 0.0.0.0 | 49159 | 468 | lsass.exe | Keylso;Netlogon;SamSs |
| B-MB2-BONNEY-VM | TCP | 0.0.0.0 | 61107 | 452 | services.exe | |
| B-MB2-BONNEY-VM | TCP | 0.0.0.0 | 61111 | 2236 | svchost.exe | PolicyAgent |
| B-MB2-BONNEY-VM | TCP | 192.168.185.162 | 139 | 4 | System | |
| B-MB2-BONNEY-VM | UDP | 0.0.0.0 | 123 | 888 | svchost.exe | EventSystem;FontCache;netprofm;nsi;W32Time;WdiServiceHost;WebClient |
| B-MB2-BONNEY-VM | UDP | 0.0.0.0 | 500 | 912 | svchost.exe | AeLookupSvc;BITS;EapHost;IKEEXT;iphlpsvc;LanmanServer;MMCSS;ProfSvc;Schedule;SENS;ShellHWDetection;Themes;Winmgmt;wuauserv |
| B-MB2-BONNEY-VM | UDP | 0.0.0.0 | 4500 | 912 | svchost.exe | AeLookupSvc;BITS;EapHost;IKEEXT;iphlpsvc;LanmanServer;MMCSS;ProfSvc;Schedule;SENS;ShellHWDetection;Themes;Winmgmt;wuauserv |
| B-MB2-BONNEY-VM | UDP | 0.0.0.0 | 5355 | 1044 | svchost.exe | Dnscache |
| B-MB2-BONNEY-VM | UDP | 0.0.0.0 | 137 | 4 | System | |
| B-MB2-BONNEY-VM | UDP | 192.168.185.162 | 138 | 4 | System | |
| B-MB2-BONNEY-VM | UDP | 192.168.185.162 | 1900 | 3248 | svchost.exe | SSDPSRV |
| B-MB2-BONNEY-VM | UDP | 192.168.185.162 | 59865 | 3248 | svchost.exe | SSDPSRV |

Fig. 4B

Installed Applications

| Node | Name | Version |
|---|---|---|
| B-MB2-BONNEY-VM | Adobe Acrobat 9 Standard | 9.2.0 |
| B-MB2-BONNEY-VM | Adobe Acrobat 9.2.0 - CPSID_50026 | |
| B-MB2-BONNEY-VM | Adobe Reader XI (11.0.03) | 11.0.03 |
| B-MB2-BONNEY-VM | Batch Compiler 2013 1.0.0 | 1.0.0 |
| B-MB2-BONNEY-VM | GeoVision AAC | |
| B-MB2-BONNEY-VM | GeoVision ADPCM | |
| B-MB2-BONNEY-VM | GeoVision H264 | |
| B-MB2-BONNEY-VM | GeoVision JPEG | |
| B-MB2-BONNEY-VM | GeoVision MJPG | |
| B-MB2-BONNEY-VM | GeoVision MPEG4 ASP | |
| B-MB2-BONNEY-VM | GeoVision MPEG4 AVC | |
| B-MB2-BONNEY-VM | GeoVision MXPG | |
| B-MB2-BONNEY-VM | Juniper Networks Network Connect 7.3.0 | 7.3.0.22751 |
| B-MB2-BONNEY-VM | Kiwi CatTools 3.9.1 (Standard Edition) | 3.9.1 (Standard Edition) |
| B-MB2-BONNEY-VM | Microsoft .NET Framework 4 Client Profile | 4.0.30319 |
| B-MB2-BONNEY-VM | Microsoft .NET Framework 4 Extended | 4.0.30319 |
| B-MB2-BONNEY-VM | Microsoft Office 2010 Service Pack 1 (SP1) | |
| B-MB2-BONNEY-VM | Microsoft Security Client | 4.2.0223.1 |
| B-MB2-BONNEY-VM | Microsoft Security Essentials | 4.2.223.1 |
| B-MB2-BONNEY-VM | Microsoft Silverlight | 5.1.20513.0 |
| B-MB2-BONNEY-VM | Microsoft Visio Professional 2010 | 14.0.4763.1000 |
| B-MB2-BONNEY-VM | Microsoft Visual C++ 2008 Redistributable - x64 9.0.21022 | 9.0.21022 |
| B-MB2-BONNEY-VM | Microsoft Visual C++ 2008 Redistributable - x64 9.0.30729.4148 | 9.0.30729.4148 |
| B-MB2-BONNEY-VM | Microsoft Visual C++ 2008 Redistributable - x64 9.0.30729.6161 | 9.0.30729.6161 |
| B-MB2-BONNEY-VM | Microsoft Visual C++ 2008 Redistributable - x86 9.0.21022 | 9.0.21022 |
| B-MB2-BONNEY-VM | Microsoft Visual C++ 2008 Redistributable - x86 9.0.30729.4148 | 9.0.30729.4148 |
| B-MB2-BONNEY-VM | Microsoft Visual C++ 2008 Redistributable - x86 9.0.30729.6161 | 9.0.30729.6161 |
| B-MB2-BONNEY-VM | Microsoft Visual C++ 2010 x64 Redistributable - 10.0.30319 | 10.0.30319 |
| B-MB2-BONNEY-VM | Microsoft Visual J# 2.0 Redistributable Package - SE (x64) | 2.0.50728 |
| B-MB2-BONNEY-VM | Mozilla Firefox 23.0.1 (x86 en-US) | 23.0.1 |
| B-MB2-BONNEY-VM | Mozilla Maintenance Service | 23.0.1 |
| B-MB2-BONNEY-VM | Notepad++ | 6.4.2 |
| B-MB2-BONNEY-VM | PDFCreator | 1.7.0 |
| B-MB2-BONNEY-VM | PGP Desktop | 10.1.0.860 |
| B-MB2-BONNEY-VM | screen-scraper Basic Edition | 6 |
| B-MB2-BONNEY-VM | Specops Password Client (x64) | 6.1.21127.1 |
| B-MB2-BONNEY-VM | Symantec Endpoint Protection | 12.1.2015.2015 |
| B-MB2-BONNEY-VM | Take Command x64 15.01 | 15.01.52 |
| B-MB2-BONNEY-VM | VLC media player 2.0.7 | 2.0.7 |
| B-MB2-BONNEY-VM | VMware Tools | 9.2.2.18018 |
| B-MB2-BONNEY-VM | VMware vSphere Client 5.1 | 5.1.0.1557 |
| B-MB2-BONNEY-VM | WinMerge 2.14.0 | 2.14.0 |
| B-MB2-BONNEY-VM | WinRAR 4.20 (64-bit) | 4.20.0 |
| B-MB2-BONNEY-VM | X264 | |
| B-MB2-BONNEY-VM | XVID | |

Fig. 4C

Local User Accounts

| Node | Username | Is Active | Password Last Set |
|---|---|---|---|
| B-MB2-BONNEY-VM | Administrator | Yes | 5/8/2013 13:57 |
| B-MB2-BONNEY-VM | Guest | No | 8/30/2013 10:14 |
| B-MB2-BONNEY-VM | ptb | Yes | 5/7/2013 21:51 |
| B-MB2-BONNEY-VM | test | Yes | 8/9/2013 15:08 |

Fig. 4D

Local User Groups

| Node | Group | User |
|---|---|---|
| B-MB2-BONNEY-VM | Administrators | Administrator |
| B-MB2-BONNEY-VM | Administrators | HOOSIER\IS |
| B-MB2-BONNEY-VM | Administrators | HOOSIER\ITAdmins |
| B-MB2-BONNEY-VM | Administrators | HOOSIER\ptb |
| B-MB2-BONNEY-VM | Administrators | ptb |
| B-MB2-BONNEY-VM | Guests | Guest |
| B-MB2-BONNEY-VM | IIS_IUSRS | NT AUTHORITY\IUSR |
| B-MB2-BONNEY-VM | Users | HOOSIER\Domain Users |
| B-MB2-BONNEY-VM | Users | NT AUTHORITY\Authenticated Users |
| B-MB2-BONNEY-VM | Users | NT AUTHORITY\INTERACTIVE |
| B-MB2-BONNEY-VM | Users | ptb |
| B-MB2-BONNEY-VM | Users | test |

Fig. 4E

Local Audit Policy

| Node | Setting | Value |
|---|---|---|
| B-MB2-BONNEY-VM | AuditSystemEvents | 3 |
| B-MB2-BONNEY-VM | AuditLogonEvents | 3 |
| B-MB2-BONNEY-VM | AuditObjectAccess | 3 |
| B-MB2-BONNEY-VM | AuditPrivilegeUse | 3 |
| B-MB2-BONNEY-VM | AuditPolicyChange | 3 |
| B-MB2-BONNEY-VM | AuditAccountManage | 3 |
| B-MB2-BONNEY-VM | AuditProcessTracking | 3 |
| B-MB2-BONNEY-VM | AuditDSAccess | 3 |
| B-MB2-BONNEY-VM | AuditAccountLogon | 3 |

Fig. 4F

Local Password Policy

| Node | Setting | Value |
|---|---|---|
| B-MB2-BONNEY-VM | MinimumPasswordAge | 10 |
| B-MB2-BONNEY-VM | MaximumPasswordAge | 90 |
| B-MB2-BONNEY-VM | MinimumPasswordLength | 6 |
| B-MB2-BONNEY-VM | PasswordComplexity | 0 |
| B-MB2-BONNEY-VM | PasswordHistorySize | 10 |

Fig. 4G

COMPUTERIZED SYSTEM FOR COMPLYING WITH CERTAIN CRITICAL INFRASTRUCTURE PROTECTION REQUIREMENTS

RELATED APPLICATION

This application is a continuation of U.S. application Ser. No. 16/110,241 filed Aug. 23, 2018 (now U.S. Pat. No. 10,389,737), which was a continuation of U.S. application Ser. No. 14/492,345 filed Sep. 22, 2014 (now U.S. Pat. No. 10,069,847), which claimed the benefit of U.S. Provisional Application Ser. No. 61/885,570 filed Oct. 2, 2013. These applications are hereby incorporated by reference in their entities.

TECHNICAL FIELD

This disclosure relates generally to a computerized system and method for complying with certain critical infrastructure protection ("CIP") requirements. In particular, this disclosure relates to a computerized tool that detects and reports modifications to computer system and software configuration changes.

BACKGROUND AND SUMMARY

Government entities have identified certain industry sectors that are critical to that nation or region's security, economy, public health and safety. Examples of industries deemed critical infrastructures include energy, banking and finance, health care and telecommunications. Since these industries rely heavily on computerized information systems and electronic data, government entities have mandated certain computer security requirements for organizations in these sectors to protect against cyber-attacks. In the U.S. energy industry, for example, critical infrastructure protection ("CIP") standards are written and enforced by the North American Electric Reliability Company ("NERC").

One of these CIP standards requires tracking of system changes made to computers, network devices and related software within a company. This requires establishment of a baseline configuration for each system and related software so any changes can be tracked. However, existing methods for capturing baseline configurations, such as taking screen shots and copying command line output, can be tedious and time consuming. These capturing techniques also tend to be error-prone, which can result in an error-prone testing process. There are existing software products that gather certain system parameters, but these products do not capture all necessary system information and cannot be used to detect system changes on an on-going basis.

According to one aspect, this disclosure provides a software tool for complying with CIP standards concerning system configuration changes. The tool can be used to automatically identify and track changes to computers on the network, improving system security and CIP compliance reporting. In certain embodiments, the tool collects system information on servers and workstations using built-in commands. A number of profile elements can be collected by the tool, such as installed applications, and network ports and services. The configuration profiles of these computers/devices can be archived for audit purposes. Any changes in configuration profiles are detected based on historical baseline configurations. For example, a daily email or on-demand report, could be generated by the tool to identify any configuration changes made across the plurality of computers in an organization.

According to another aspect, this disclosure provides a computerized system for complying with certain critical infrastructure protection requirements. The system includes a non-transitory computer-readable medium having a computer program code stored thereon. A database is provided that includes one or more records that establishes baseline system configurations for a plurality of devices. A processor is in communication with the computer-readable memory configured to carry out instructions in accordance with the computer program code. When the processor executes the computer program code, it performs certain operations. One of the operations is collecting system information for a plurality of devices on a communications network. At least a portion of the devices for which system information is collected are cyber-critical assets. The collected system information for the plurality of devices is compared with the baseline system configurations stored in the database to determine whether any changes have been made. Whether changes have been made to any devices are reported responsive to the comparing step.

According to a further aspect, this disclosure provides a computerized system for complying with certain critical infrastructure protection requirements regarding a plurality of machines at least a portion of which are networked together. The system includes a collection host programmed with a configuration collection engine. The configuration collection engine is configured to gather system information from at least a portion of the machines on the network. A database is provided that has stored one or more records that establishes baseline system configurations for the plurality of machines on the network. The system also includes a reporting server configured to monitor for system changes to one or more of the plurality of machines on the network based on a comparison between system information gathered by the collection host and the baseline system configurations in the database. The reporting server is configured to periodically send a report over a communications network indicative of whether any system changes have been made to any of the plurality of machines.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which:

FIGS. 4A-4G are examples of profile elements that could be gathered and compared according to an embodiment to the disclosure.

Figure 1:
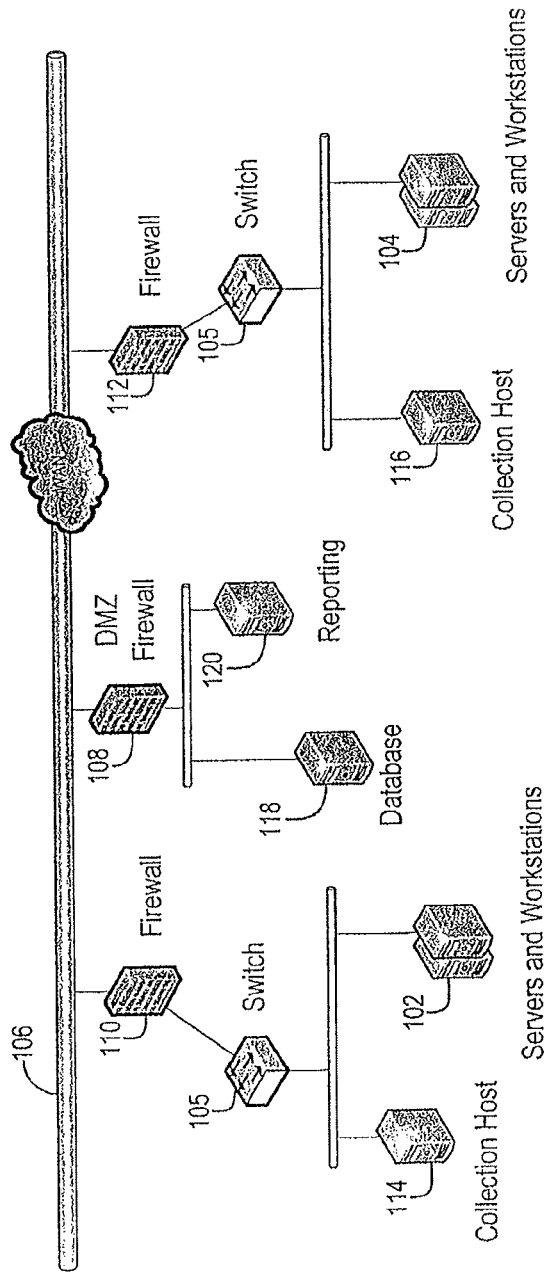
FIG. 1 is a diagrammatic view of a network arrangement in which embodiments of the present disclosure may be utilized.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

The detailed description which follows is presented in part in terms of algorithms and symbolic representations of operations on data bits within a computer memory representing alphanumeric characters or other information. A computer generally includes a processor for executing instructions and memory for storing instructions and data. When a general purpose computer has a series of machine encoded instructions stored in its memory, the computer operating on such encoded instructions may become a specific type of machine, namely a computer particularly configured to perform the operations embodied by the series of instructions. Some of the instructions may be adapted to produce signals that control operation of other machines and thus may operate through those control signals to transform materials far removed from the computer itself. These descriptions and representations are the means used by those skilled in the art of data processing arts to most effectively convey the substance of their work to others skilled in the art.

An algorithm is here and is generally conceived to be a self-consistent sequence of steps leading to a desired result. These steps are those requiring physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and providing increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, the distinction between the method operations in operating a computer and the method of computation itself should be recognized. A method and apparatus are disclosed for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself, rather as a result of an instruction.

An apparatus is disclosed for performing these operations. This apparatus may be specifically constructed for the required purposes, or it may comprise a general purpose computer as selectively activated or reconfigured by a computer program stored in the computer. The algorithms presented herein are not inherently related to any particular computer or other apparatus unless explicitly indicated as requiring particular hardware. In some cases, the computer programs may communicate or relate to other programs or equipment through signals configured to particular protocols which may or may not require specific hardware or programming to interact. In particular, various general purpose machines may be used with programs written in accordance with the teachings herein, or it may prove more convenient to construct a specialized apparatus to perform the required method steps. The required structure for a variety of these machines will appear from the description below.

In the following description several terms which are used frequently have specialized meanings in the present context. The terms "network," "local area network," "LAN," "wide area network," or "WAN" mean two or more computers which are connected in such a manner that messages may be transmitted between the computers. In such computer networks, typically one or more computers operate as a "server," a computer with large storage devices such as hard disk drives and communication hardware to operate peripheral devices such as printers or modems.

As discussed below, this disclosure generally relates to a configuration management tool ("CCT"), which is a software utility that can be used to monitor system configuration changes in a plurality of computers and other electronic devices within an organization, which allows the organization to comply with certain critical infrastructure protection ("CIP") standards. In certain embodiments, the CCT collects system information on servers and workstations using built-in commands, such as installed applications, and network ports and services. The configuration profiles of these computers/devices can be archived for audit purposes. Any changes in configuration profiles compared to baseline configurations can be monitored and reported. For example, a detailed report, such as a daily email or on-demand report, can be generated by the CCT to identify any configuration changes made across the plurality of computers in the organization. In certain embodiments, the CCT is self-contained and can be executed and managed from a central location, making deployment simple.

The CCT provides crucial information that can be used to identify and track changes to computers on the network, improving system security and compliance reporting.

FIG. 1 is a diagram of an exemplary network 100 of an organization that desires to comply with CIP standards. In this example, the network 100 spans a first location with a plurality of computers 102 and a second location with a plurality of computers 104. Although two locations are shown for purposes of example, the network could be located at a single location or span across more than two locations depending on the circumstances of the organization. The computers 102, 104 could be servers, workstations or other computing devices. Each computer 102, 104 in the network 100 may be operatively connected with one or more other devices by a wired or wireless connection, such as using a network switch 105 or other communications device(s).

Devices on the network 100 may communicate between the first and second locations via a wide area network ("WAN") 106. In the exemplary embodiment shown, the network 100 includes a DMZ 108 that exposes external-facing services of the organization. As shown, the network 100 includes a firewall 110 at the first location and a firewall 112 at the second location to ensure that devices within the network 100 are not communicating with known suspect locations or devices outside the network.

In the embodiment shown, the network 100 includes a first collection host 114 at the first location and a second collection host 116 at the second location. The CCT is executed by the collection hosts 114, 116 to gather configuration profiles from devices on the network 100, such as computers 102, 104, switch 105, DMZ 108 and firewalls 110, 112. The devices on the network 100 for which configuration profiles are collected may include critical cyber assets (CCA's), non-critical cyber assets (non-CCA's) and other supporting devices.

The configuration profiles collected by the collection hosts 114, 116 are stored in a database 118. For example, configuration profiles may be gathered on a daily basis from the devices on the network 100 and stored in the database to accumulate baseline configuration profiles for each device on the network 100.

A reporting server 120 is provided to monitor changes in system configurations. For example, the reporting server may be configured to perform a comparison of baseline configurations stored in the database 118 with currently gathered configurations to determine what changes have been made and report these to a system administer or other user(s). By way of example, the reporting server 120 could compare yesterday's configuration profiles stored in the database 118 with a currently gathered set of profiles collected by collection hosts 114, 116 and report any differences between these configurations.

Figure 2:
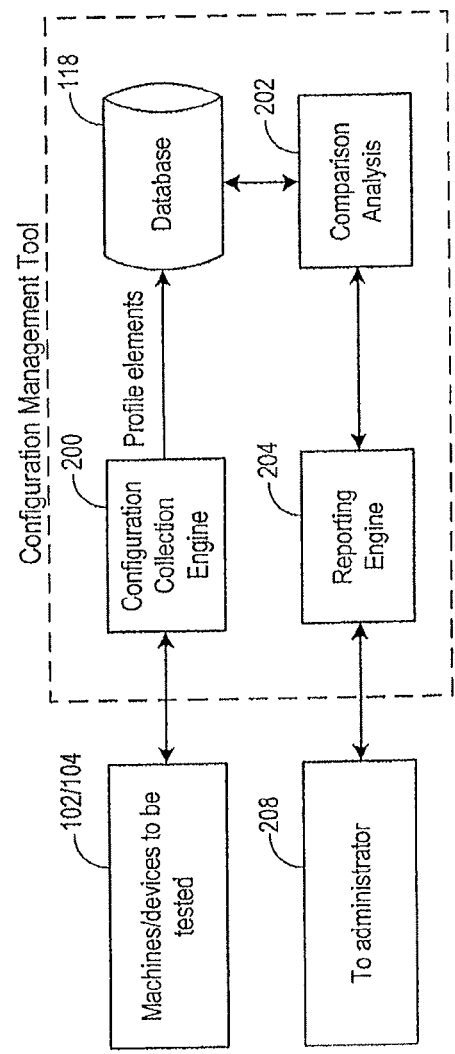
FIG. 2 is a block diagram showing modules of an example configuration management tool according to an embodiment of the present disclosure.

FIG. 2 is a diagram showing modules of the CCT according to certain embodiments. In the example shown, the CCT includes a configuration collection engine 200, a comparison analysis module 202, and a reporting engine 204. The term "module" includes an identifiable portion of computer code, computational or executable instructions, data, or computational object to achieve a particular function, operation, processing, or procedure. A module may be implemented in software, hardware/circuitry, or a combination of software and hardware. An identified module of executable code, for example, may comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code could be a single instruction, or many instructions, and may even be distributed over several different code segments, among different programs, and across several memory devices. Similarly, modules representing data may be embodied in any suitable form and organized within any suitable type of data structure. The data may be collected as a single data set, or may be distributed over different locations including over different storage devices.

The configuration collection engine 200 is configured to gather configuration profiles for devices 102/104 on the network for which configuration data is desired. By way of example only, the following is a non-exhaustive list of profile elements that could be gathered by the configuration collection engine:

Antivirus definition version information
Installed applications
Local Audit policy settings
Local user groups
Basic system information such as hardware manufacturer and model, hard drive space, operating system, service pack level, domain/workgroup . . .
Installed Windows® hotfixes (patches)
Network adapter information including IP address, MAC address, etc.
TCP and UDP ports and services/sub-services
Local password policy
Installed Windows® services showing current state and startup mode
Local user accounts
Windows® firewall rules
Scheduled tasks
Advanced Windows® update information The terms "profile element" and "profile elements" are broadly intended to encompass any system or configuration information for devices on the network that can be gathered and should not be restricted to the profile elements listed above. In certain embodiments for gathering configuration profiles of Windows®-based machines (Windows® is offered by Microsoft Corporation of Redmond, Wash.), the configuration collection engine 200 runs on each collection host 114, 116, copying files needed to run the configuration management tool, to each computer from a central repository. In certain embodiments, these files include the main application and supporting Visual Basic™ script files. For purposes of example only, the following command could be performed by each collection host 114, 116 to tell selected servers and workstations (via a configuration file) to execute the software in the Windows® environment:

wmic/node:<ip address> process call create "cmd.exe/c C:\WCMU\WCMU.bat"

Figure 3:
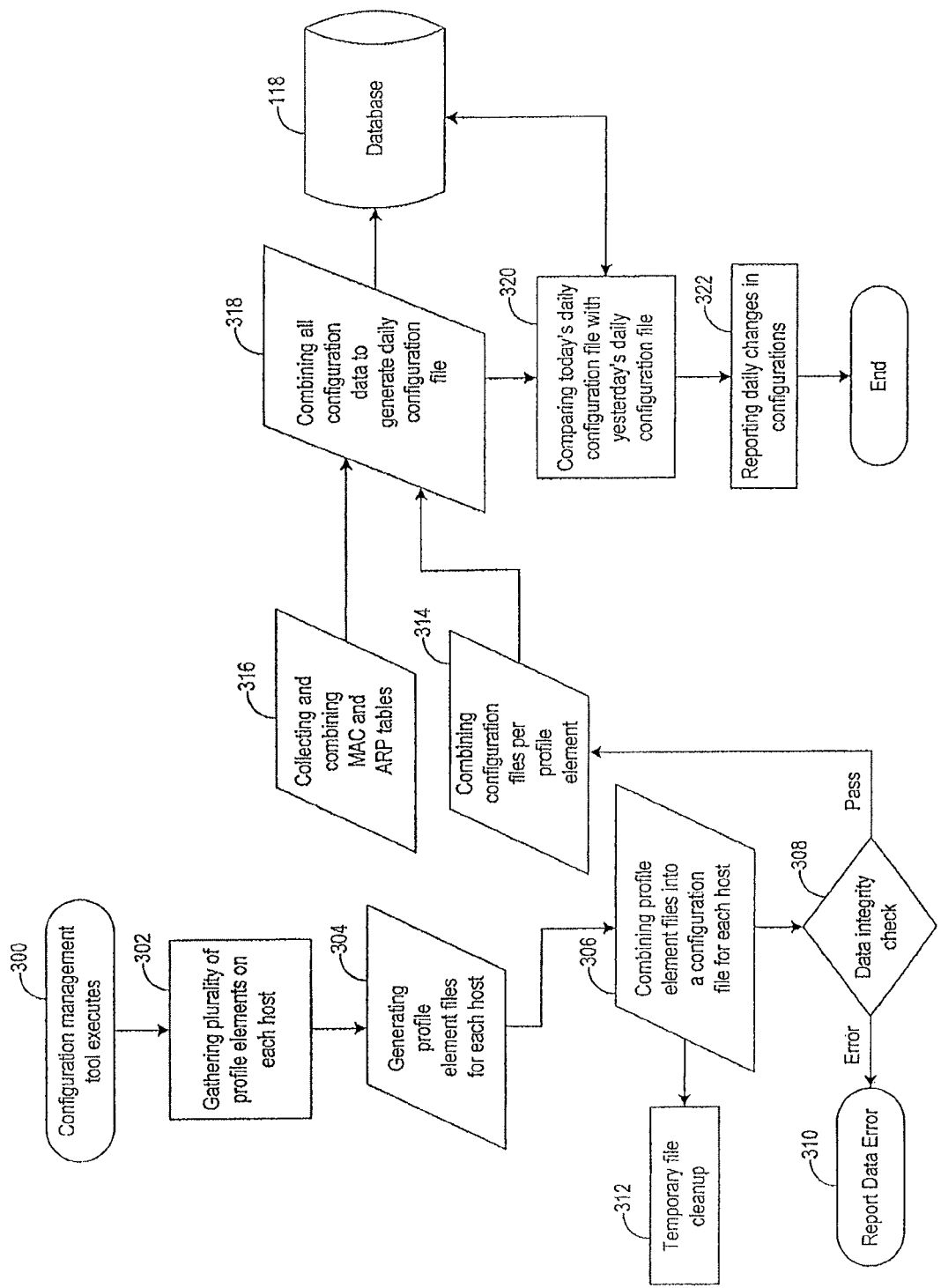
FIG. 3 is a flow chart showing example steps that could be made in a process according to an embodiment of the disclosure.

One skilled in the art should appreciate that the exact command to be executed on collection hosts 114, 116 may differ depending on the circumstances. Referring to FIG. 3, the execution of the configuration management tool corresponds to block 300. The tool generates a profile file for each profile element on all selected servers and workstations (and other devices), which corresponds to blocks 302 and 304 in FIG. 3.

The following is a non-exhaustive list of example commands in the Windows® environment that could be used to gather different types of configuration information from the selected servers and workstations, which could be included in the "WCMU.bat" file in the example provided above:

1. System info
"WMIC OS GET CAPTION,CSDVERSION/FORMAT: CSV"
2. Password and Audit policy
"SECEDIT/EXPORT/AREAS SECURITYPOLICY/ CFG C:\<PATH>
3. Installed Applications
Note: In certain embodiments, installed application data is collected from three sources and then combined. Since some of the information collected will be duplicates, the list can be deduped before writing the final output file.
"WMIC PRODUCT GET NAME,VERSION/FORMAT: CSV"
HKLM\Software\Wow6432Node\Microsoft\Windows\CurrentVersion\Uninstall (Parse "DisplayName" and "Display Version" using VB or Powershell)
HKLM\SOFTWARE\Microsoft\Windows\CurrentVersion\Uninstall (Parse "DisplayName" and "Display Version" using VB or Powershell)
4. Disk Drives
"WMIC LOGICALDISK GET NAME,DESCRIPTION, FREESPACE,SIZE"
5. Local User Accounts
Note: Collect all users with NETSH DUMP, then run net user against each username to show the account enabled or disabled and date of the last password reset)
"NETSH DUMP"
"NET USER"
6. Local User Groups
Note: The WMIC script is used to collect all local account groups. Using that information, we look at each group individually using net localgroup to see what accounts are in that group.)
"WMIC GROUP WHERE "LocalAccount=TRUE" LIST STATUS/FORMAT:CSV"
"NET LOCALGROUP"
7. Installed Windows® Hotfixes
"WMIC QFE GET HOTFIXID,DESCRIPTION,INSTALLEDON/FORMAT:CSV"
8. Network Interfaces
Note: Collect info for all network adapters, then use that data for running nicconfig on each to get the IP address. Join the two lists together where the MAC address is the same.)
"WMIC NIC GET INDEX,NETCONNECTIONID,DESCRIPTION,MACADDRESS/FORMAT:CSV"
"WMIC NICCONFIG GET INDEX,MACADDRESS,IPADDRESS/FORMAT:CSV"
9. Windows® Services
"WMIC SERVICE GET DISPLAYNAME,NAME, STARTMODE,STATE/FORMAT:CSV"
10. Ports and Services
Note: Listening TCP and all UDP are collected initially. Tasklist is run to generate a list of running processes. Output is parsed, replacing commas with another character. The two lists are then joined by PID. The final output omits local loopback ports "127.0.0.x" and PID.)
"NETSTAT—ANO"
"TASKLIST.EXE/SVC/FO CSV"
11. Antivirus Definitions
Note: Collecting antivirus definition information is vendor specific, and accomplished by parsing client log files. Symantec Endpoint Protection stores its definfo.dat file in the "all users" profile. This file contains the information about antivirus definitions. The processes could be modified for other antivirus vendors as long as there is a text file or log file available.)
For Server 2008/Windows 7—c:\Users\All Users\Symantec\Symantec EndpointProtection\CurrentVersion\Data\Definitions\VirusDefs\definfo.dat
For Server 2003/XP—c:\Documents and Settings\All Users\Application Data\Symantec\Symantec Endpoint Protection\CurrentVersion\Data\Definitions\VirusDefs\definfo.dat
12. Advanced Windows® Update
Note: Advanced WSUS information is collected by parsing the windowsupdate.log file located in the root of the Windows® directory. This file contains much information, but only a small portion is being collected for comparison.
13. Scheduled Tasks
Note: The SCHTASKS command outputs differently on older versions of Windows® server and workstation. In all cases, the description field may contain commas which is a problem when delimiting. Replace the commas in the description field with another character, or remove them completely for a properly delimited output.
"SCHTASKS/QUERY/V/FO CSV"
14. Windows® Firewall
Note: Firewall rules are collected using a custom VB script that calls the advfirewall API. A modified version of Microsoft's script was used to collect the data. (http://msdn.microsoft.com/en-us/library/ aa364720%28VS.85%29.aspx)

In certain embodiments, the profile files could be CSV files. In the embodiment shown, these profile files are then combined into a configuration file for each device. (Block 306). In some embodiments, the configuration file could be named "<hostname>-Profile.csv" (where <hostname> is the computer's Windows® host name). After the files are generated, they are archived locally and sent to the collection hosts 114, 116. In some circumstances, a data integrity check could be made on the configuration files. (Block 308). For example, a third party hashing tool called "md5sum" could be used to create an MD5 file containing the <hostname>-Profile.csv hash. If the data integrity check fails (block 310), an error could be presented or logged. In some cases, the tool will clean up by removing any supporting scripts to prepare for the next run. (Block 312). The collection hosts 114, 116 combine all previously generated files from each server and workstation into a file per profile element (block 314), which is stored in the database 118 for comparison preparation and archiving. The configuration collection engine 200 could be configured to collect network information, such as MAC and ARP tables (e.g., using a third party tool) from selected network switches on the network. These tables could be combined together and stored in the database 118 for later comparison. (Block 316). In certain embodiments, all profile element files could be combined together into a daily configuration file that contains configuration information for all devices on the network for which configuration information is being tracked. (Block 318).

The comparison analysis module 202 is configured to compare an existing baseline configuration with a current configuration to determine what modifications, if any, have been made. (Block 320). In certain embodiments, the comparison could be performed by doing a line-by-line comparison to the previous day's data using a third party text comparison tool. The results of the comparison can be reported by the reporting engine 204, such as in an email to a system administrator 208 (or other users). (Block 322).

The CCT helps compliance with multiple CIP standards, including but not limited to:

CIP-003 R6 Change Control and Configuration—Easy to compare a "before" and "after" configuration CIP-007 R1 Test Procedures—What changed during testing, what should we expect to change on production systems?

CIP-007 R2 Ports and Services—Good view of listening ports and what service is using the port CIP-007 R3 Patch Management—Windows® patches easily available, with install date. Third party applications available as well.

CIP-007 R4 Malicious Software Prevention

CIP-007 R5 Account Management

FIGS. 4A-4G show example profile elements that could be collected and compared on an ongoing basis to determine configuration changes.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. One or more non-transitory, computer-readable storage media comprising a plurality of instructions that in response to being executed cause a computing device to:

collect system information by communicating with a plurality of devices over an electronic communications network to execute a plurality of command line operations on the plurality of devices, wherein the command line operations are selected to target extraction of profile elements based on one or more critical infrastructure protection ("CIP") standards in one or more of the following: CIP-003 R6, CIP-007 R1, CIP-007 R2, CIP-007 R3, CIP-007 R4, and/or CIP-007 R5;

compare the collected system information for the plurality of devices with baseline system configurations to determine whether any changes have been made that could indicate a potential threat;

remediate one or more items based on a determination that one or more changes have been made that could indicate a potential threat; and set the collected system information as the baseline system configurations for the plurality of devices based on a determination that no changes have been made that could indicate a potential threat.

2. The one or more non-transitory, computer-readable storage media as recited in claim 1, wherein to collect system information comprises collecting at least a portion of the system information by running commands built into the device for which system information is being collected to gather one or more of local audit policy settings, local user groups, hardware manufacturer, model, hard drive space, operating system, service pack level, patches to a device, network adapter information, TCP ports and services, UDP ports and services, antivirus definition version information, installed applications and/or local password policy.

3. The one or more non-transitory, computer-readable storage media as recited in claim 1, wherein a plurality of profile elements for respective devices are combined into respective profile configurations for each device.

4. The one or more non-transitory, computer-readable storage media as recited in claim 1, further comprising one or more instructions to archive the collected system information indexed by date collected.

5. The one or more non-transitory, computer-readable storage media as recited in claim 1, wherein at least a portion of the devices for which system information is collected are non-critical cyber assets.

6. The one or more non-transitory, computer-readable storage media as recited in claim 1, wherein the devices for which system information is collected includes: servers, workstations, network devices, installed applications, network ports, and services.

7. The one or more non-transitory, computer-readable storage media as recited in claim 1, further comprising one or more instructions to identify changes to system information since the baseline system configuration.

8. The one or more non-transitory, computer-readable storage media as recited in claim 1, further comprising one or more instructions to automatically send a periodic report identifying whether any changes have been made that could indicate a potential threat on at least a daily basis.

9. One or more non-transitory, computer-readable storage media comprising a plurality of instructions that in response to being executed cause a computing device to:

collect system information by communicating with a plurality of devices over an electronic communications network to execute a plurality of command line operations on the plurality of devices to gather one or more of local audit policy settings, local user groups, hardware manufacturer, model, hard drive space, operating system, service pack level, patches to a device, network adapter information, TCP ports and services, UDP ports and services, antivirus definition version information, installed applications and/or local password policy, wherein the command line operations are selected to target extraction of profile elements based on one or more critical infrastructure protection ("CIP") standards in one or more of the following: CIP-003 R6, CIP-007 R1, CIP-007 R2, CIP-007 R3, CIP-007 R4, and/or CIP-007 R5;

compare the collected system information for the plurality of devices with baseline system configurations to determine whether any changes have been made that could indicate a potential threat;

remediate one or more items based on a determination that one or more changes have been made that could indicate a potential threat; and set the collected system information as the baseline system configurations for the plurality of devices based on a determination that no changes have been made that could indicate a potential threat; and wherein the devices for which system information is collected includes: servers, workstations, network devices, installed applications, network ports, and/or services.

10. The one or more non-transitory, computer-readable storage media as recited in claim 9, wherein a plurality of profile elements for respective devices are combined into respective profile configurations for each device.

11. The one or more non-transitory, computer-readable storage media as recited in claim 9, further comprising one or more instructions to archive the collected system information indexed by date collected.

12. The one or more non-transitory, computer-readable storage media as recited in claim 9, wherein at least a portion of the devices for which system information is collected are non-critical cyber assets.

13. The one or more non-transitory, computer-readable storage media as recited in claim 9, further comprising one or more instructions to identify changes to system information since the baseline system configuration.

14. The one or more non-transitory, computer-readable storage media as recited in claim 9, further comprising one or more instructions to automatically send a periodic report identifying whether any changes have been made that could indicate a potential threat on at least a daily basis.

15. A method of detecting a potential threat to one or more critical cyber assets, the method comprising:

collecting, by a computing device, system information by communicating with a plurality of devices over an electronic communications network to execute a plurality of command line operations on the plurality of devices to gather one or more of local audit policy settings, local user groups, hardware manufacturer, model, hard drive space, operating system, service pack level, patches to a device, network adapter information, TCP ports and services, UDP ports and services, antivirus definition version information, installed applications and/or local password policy, wherein the command line operations are selected to target extraction of profile elements based on one or more critical infrastructure protection ("CIP") standards in one or more of the following: CIP-003 R6, CIP-007 R1, CIP-007 R2, CIP-007 R3, CIP-007 R4, and/or CIP-007 R5;

comparing, by the computing device, the collected system information for the plurality of devices with baseline system configurations to determine whether any changes have been made that could indicate a potential threat;

remediating, by the computing device, one or more items based on a determination that one or more changes have been made that could indicate a potential threat; and setting, by the computing device, the collected system information as the baseline system configurations for the plurality of devices based on a determination that no changes have been made that could indicate a potential threat; and wherein the devices for which system information is collected includes: servers, workstations, network devices, installed applications, network ports, and/or services.

16. The method as recited in claim 15, wherein a plurality of profile elements for respective devices are combined into respective profile configurations for each device.

17. The method as recited in claim 15, further comprising the step of archiving the collected system information indexed by date collected.

18. The method as recited in claim 15, wherein at least a portion of the devices for which system information is collected are non-critical cyber assets.

19. The method as recited in claim 15, further the step of identifying changes to system information since the baseline system configuration.

20. The method as recited in claim 15, further comprising the step of automatically sending a periodic report identifying whether any changes have been made that could indicate a potential threat on at least a daily basis.

* * * * *